2,973,305

PROCESS FOR PREPARING FLAVINADENINE DINUCLEOTIDE AND REDUCED-FORM THEREOF

Toru Masuda, Naruo-cho, Nishinomiya, Hyogo, Yoshio Yamamoto, Amagasaki, Hyogo, and Juzo Kaneko, Mishima-gun, Osaka, Japan, assignors to Takeda Pharmaceutical Industries, Ltd., Higashi-ku, Osaka, Japan No Drawing. Filed June 28, 1955, Ser. No. 518,676

Claims priority, application Japan July 8, 1954

4 Claims. (Cl. 195—77)

This invention relates to improvements in the process for preparing flavinadenine dinucleotide (referred to as FAD for short). This invention furnishes useful methods for extracting FAD from the culture of certain kinds of microorganisms and separating FAD from other FAD-containing substances.

Straub (Nature, 141, 603 (1938)), and Warburg and Christian (Biochem. Z., 295, 261; 298, 150 (1938)) isolated an active coenzyme of D-α-amino acid oxidase from yeast, etc. respectively, and identified it as FAD composed of one mole of riboflavin, one mole of adenosine and two moles of phosphoric acid. According to the reports FAD is extensively distributed in the body of microorganisms, but yeast is the most convenient source for the preparation of FAD.

FAD has a great significance as a coenzyme in oxidation in the living body. In the leuco form it acts as recipient of hydrogen. Enzymes which require FAD as coenzyme are D-α-amino acid oxidase, DPN-cytochrome C reductase, diapholase I, glucose dehydrogenase (Notatin), aldehyde oxidase, xanthine oxidase, quinine oxidase, histaminase, fumaric hydrogenase, etc. FAD is an essential substance for the living body. FAD is also being used as an indispensable reagent in the study of enzymes and in the enzymatic determination of substrates.

The outline of the preparation of FAD by Warburg and Christian is as follows. Protein is eliminated from the extract of the starting material, and the FAD in the extract is taken up in a solvent by making use of its difference in distribution coefficient in two solvents, then precipitated as Ag-salt and finally isolated through Ba-salt. In this case the yield is as small as 1.3 mg. from 1 kg. of the kidney or liver of the horse, or 2.6 mg. from 1 kg. of yeast. Moreover, the method is not only too complicated for industrial preparation of FAD but also non-economical.

The present inventors previously found that the crude vitamin $B_2$ (referred to hereinafter as V. $B_2$) obtained by submerged culture of *Eremothecium ashbyii* is contaminated with a little FAD, and that FAD is contained in a large quantity in the mycelium of the fungus. After strenuous studies thereafter the present inventors discovered further the following facts. In the culture of the V. $B_2$-producing fungus, accumulation of FAD in the mycelium is small in the period of propagation but markedly increases in the period when the weight of the mycelium decreases; the FAD in the mycelium is decomposed by autolysis of the mycelium; in the culture of the V. $B_2$-producing fungus in a liquid medium FAD is hardly accumulated in other culture substances than the mycelium; FAD can be readily extracted from the mycelium with water or an aqueous solvent; reduced-form FAD is sparingly soluble in water and other solvents, accordingly FAD can be precipitated in this form; reduced-form FAD is easily oxidized to recover oxidized-form FAD.

The present invention is based on the abovementioned new findings on formation and accumulation of FAD in the body of microorganisms and difference between reduced-form and oxidized-form FAD in solubility.

The preparation of FAD in this invention includes not only the preparation of pure or nearly pure FAD but also that of crude or impure FAD.

As V. $B_2$-producing microorganisms are used *Eremothecium ashbyii*, *Ashbya gossippi*, etc., and to make them produce FAD they are aerobically cultivated on a solid or liquid medium, but favorably by deep tank culture under the conditions described below.

As in the preparation of V. $B_2$ the medium contains carbon and nitrogen sources, phosphate, other inorganic salts, and in many cases a trace of metals. The metals are generally contained in traces as impurities in other substances of the medium. As carbon source are used water-soluble carbohydrates, such as saccharose, glucose, maltose, fructose, etc., as nitrogen source, for example, meat extract, peptone, amino acids, hydrolyzed or not hydrolyzed fish meat, soy bean protein, cornsteep liquor, the mycelium as such or processed of filamentous fungi belonging to penicillium or other genera, etc., and as inorganic substances potassium, sodium, calcium, magnesium, sulphur, iron, and certain elements in traces. Addition of a small quantity of nicotinic acid, inositol, pantothenic acid, vitamin $B_{12}$ or other growth factors is beneficial.

The culture may be conducted at pH ca. 5–8, but suitable pH is 5.5–7.5 and most suitable is pH 6.3–7.0. The culture temperature may cover a range of ca. 20–35° C., but more suitable is 27–32° C. The amount of air passed through during the culture is regulated properly according to other conditions and the kind of the strain.

Although V. $B_2$-producing fungi propagate well and the weight of the mycelium increases in the early stage of the culture, the increase of the mycelium stops after a period, and then the amount of the mycelium begins to decrease, though very slowly. We call provisionally the period during which the weight of the mycelium increases propagation period and the period thereafter retrogression period. The decrease in weight of the mycelium seems to be due to vigorous autolysis of the mycelium, compared with that during the propagation period. Formation and accumulation of FAD in the mycelium are very small in the propagation period, but gradually increase in the retrogression period, reaching a maximum after a period. But accumulation of FAD gradually decreases thereafter and finally all the FAD is decomposed by autolysis of the mycelium. Hence, if the culture is conducted for the purpose of preparing FAD, it must be stopped at a proper time. The time required for reaching the retrogression period and that necessary for the maximum accumulation of FAD vary with culture conditions and the kind of the strain used. To take *Eremothecium ashbyii* as an example, increase in weight of the mycelium stops at about 50 hours after the culture, and until ca. 140 hours the weight remains almost unchanged, but decreases thereafter appreciably. Accumulation of FAD in the mycelium is maximum at ca. 120 hours, and the mycelium separated at this time can contain FAD in the proportion of 0.15–0.3 g. or more in 10.0 g. of the mycelium as dried, whereas the mycelium separated in the propagation period contains at best only 0.06 g. of FAD in 10.0 g. of the dried mycelium.

Since the filtrate from the mycelium generally contains a considerable amount of V. $B_2$, it is beneficially employedf for recovering V. $B_2$. The FAD in the mycelium thus obtained can be favorably extracted with water or an aqueous solvent. Lower aliphatic alcohols or ketones, pyridine, etc. may be used for the purpose. However, water and aqueous solvents are most favorable because they are effective extracting solvents and are economical. It is advisable to check the enzymatic activity of the mycelium or to destroy the mycelium before the extraction in order to prevent autolysis of the mycelium. For the purpose it is convenient to heat the mycelium within the limits not to decompose FAD. When water or an aqueous solvent is used, both destruction of the mycelium and effective extraction can be attained by conducting the extraction at 60–100° C. As aqueous solvent are used aqueous solutions of various inorganic or organic compounds and buffer solutions. The solvent is selected, taking into account pH and other conditions, and a pH near neutrality is suitable because too acid or too alkaline pH is apt to decompose FAD.

Isolation of FAD from the extract is effected as follows: Difference between FAD and other substances in solubility can be utilized for the purpose. When the extract is aqueous, first of all the protein in the extract is precipitated by the addition of an organic acid or ammonium sulfate and removed. When the filtrate is concentrated and an anhydrous hydrophile organic solvent such as alcohol is added, FAD separates out.

Difference in distribution coefficient of FAD in two solvents is also utilized for the isolation of FAD. For example, when the extract free from protein is shaken with an organic solvent such as liquid phenol, in which FAD has a large distribution coefficient, flavins including FAD are transferred into the organic solvent, and when the organic solvent solution is mixed with a solvent such as ether to lower the distribution coefficient of FAD and shaken with water, flavins are again transferred into the water layer. On the other hand, if the extract is shaken with a solvent such as benzylalcohol, in which V. $B_2$ has a large distribution coefficient, the V. $B_2$ in the extract is transferred into the solvent, while FAD remains in the aqueous extract. When a pyridine-methanol extract of the mycelium is concentrated, mixed with equal volume of chloroform and shaken with water, FAD is transferred into the water, while V. $B_2$ separates out. Based on these principles isolation of FAD can be effected by counter current distribution or by partition chromatography. Difference between FAD and other substances in adsorbability may be utilized for the isolation of FAD. For example, the extract of the mycelium is mixed with an adsorbent such as active carbon, and the adsorbed FAD is eluted with a solvent. The solvent may be of the same kind as used for the extraction or of another kind. It is selected according to the kind of the adsorbent used and the quantity of the adsorbed substances.

The present inventors discovered that FAD is conveniently isolated as its reduced form. It is known (Warburg and Christian: Biochem. Z, 298, 150 (1938)) that FAD in solution is reduced to its reduced form, but up to now reduced-form FAD has never been isolated and its detailed properties were not clear. Of course, the fact that FAD can be isolated as its reduced-form is unknown.

Part of the present invention relates to collecting FAD in its reduced-form.

FAD is readily soluble in water. It dissolves, for example, in an equal volume of water. On the contrary, reduced-form FAD dissolves in water at 20° C. in the proportion of ca. 650 mg. to 100 g. Besides, reduced-form FAD is sparingly soluble or insoluble in almost all other solvents.

By making use of this property FAD can be freed from various impurities. The nature and quantity of the impurities in the FAD-containing material are immaterial in so far as they do not prevent the formation and collection of reduced-form FAD. FAD-fraction obtained from the liver or other organs of animals may be used, but the mycelium of the V. $B_2$-producing fungus is most useful for industrial purpose. If the nature and quantity of the impurities and FAD-content in the material are not suitable for the collection of reduced-form FAD, it is advisable to subject the material to the purification mentioned before to remove the impurities and enhance the FAD-content.

Reduction of FAD in the material is preferably conducted in a solvent, and that at a pH near neutrality to prevent decomposition of FAD. The reduction is effected by chemical, catalytic, electrolytic or biochemical process. Reducing agents capable of furnishing ions of $S_2O_4{}^{--}$, $Cr^{++}$, $V^{++}$, $Ti^{+++}$, etc. are used in the chemical reduction. Nascent hydrogen and $H_2S$ are also employed for the purpose. The catalytic reduction is conducted in the presence of activated Pd, Pt, Ni or the like, and generally under ordinary pressure. In the electrolytic reduction carbon, platinum, gold, silver, nickel, palladium or other metal is used as cathode. Alloys and a metal coveed ith palladium black or platinum black may be used for the purpose. The purpose is also attained by dissolving in the electrolyte a compound which acts as catalyst in the reduction.

The reduction may be conducted biochemically with a reductase. In this case the purpose is accomplished by adding microorganisms or an animal organ to a FAD solution. Reduction by microorganisms seems to be effected by the enzyme selected out of the body of the microorganisms. Reduction by microorganisms is generally accompanied with a degree of decomposition of FAD.

The reduced-form FAD thus formed generally precipitates out since it is sparingly soluble in water (650 mg.: 100 g., at 20° C.) and other solvents, and therefore it is conveniently collected by filtration or by centrifugation. Processes such as concentration and salting out may be used at the same time. Suitable pH of the liquid is near neutrality since too acid or too alkaline pH is liable to decompose FAD. Contact with air of reduced-form FAD must be avoided because it is readily oxidized. The reduced-form FAD thus collected shows a melting point of 222–225° C. (decomp.) since it is already free from the bulk of impurities.

Oxidation of reduced-form FAD may be conducted with various oxidizing agents, but it is conveniently effected with air or hydrogen peroxide without damaging the material and the product. As other oxidizing methods may be employed chemical oxidation with such oxidizing agent as $FeCl_3$, $H_2SeO_3$, $ClO^-$, chloride of lime, $MnO_2$, $SO^{--}$, $MnO_4{}^-$, $MnO_4{}^{--}$, $CrO_4{}^{--}$, $Cr_2O_3$, $Fe_2(SO_4)_3$, etc., and electrolytic, catalytic and biochemical oxidations, but in general such methods are not necessary.

Solid reduced-form FAD may be oxidized as such with air or other oxygen containing gas, but it is conveniently oxidized in the form of solution or suspension. Collection of the resulting oxidized-form FAD is carried out by the methods used in the separation of FAD from the mycelium extract.

The above-mentioned processes for separating the mycelium of the V. $B_2$-producing fungus at the retrogression period, for extracting FAD from the mycelium with water or an aqueous solvent, and for isolating FAD in its reduced-form from the extract, are all very important individually. But combination of these processes makes the preparation of FAD easier.

Some examples are shown below, but the present invention is not restricted by the examples. This invention includes all modifications of the method, so far as they are thought to be included in the idea of this invention.

Example 1

| | Percent |
|---|---|
| Polypeptone | 0.8 |
| Bonito extract | 0.8 |
| Glucose | 2.0 |
| Potassium phosphate | 0.2 |
| Magnesium sulfate | 0.1 |
| Sodium chloride | 0.1 |
| Soy bean oil | 1.1 |

Four hundred liters of a medium containing the above components is adjusted to pH 6.0, inoculated with the culture of *Eremothecium ashbyii* and cultivated at 28° C. for 65 hrs., and the culture is filtered to obtain ca. 8 kg. of wet mycelia.

One kilogram of the mycelia is extracted with 3 l. of water of 80° C. for 15 minutes with stirring, the extract is separated by filtration, and the residue is again extracted with 1 l. of water of 80° C. for 15 minutes and filtered. The combined extracts are cooled with ice-water and allowed to stand in a dark place for ca. 3 hrs., and the precipitated vitamin $B_2$ is filtered off. To the filtrate is added 20 cc. of glacial acetic acid, followed by 2 kg. of ammonium sulfate, the mixture is left standing in a cool dark place for 3 hrs., and the separated protein is filtered off. The filtrate is shaken with ca. 300 cc. of liquid phenol and the phenol layer is separated. This process is repeated three times, and the combined phenol layers are washed twice with the same volume of a saturated sodium chloride solution. The same volume of ether is added to the phenol layer, and the mixture is extracted with four 100 cc. portions of water. About 500 cc. of benzylalcohol is added to the combined extracts and shaken. This process is repeated four times to remove V. $B_2$ completely. The aqueous layer is washed with the same volume of ether, concentrated under vacuum to ca. 50 cc. and poured into ca. 500 cc. of 99% alcohol, and after cooling with ice-water the separated FAD is filtered.

Example 2

The same culture as in Example 1 is conducted for 120 hrs. to obtain ca. 7.5 kg. of wet mycelia, and 1 kg. of the mycelia is processed as in Example 1 to yield the yellow powder containing FAD.

Example 3

One kilogram of wet mycelia obtained as in Example 2 is extracted with water of 80° C. and filtered. To 4 l. of the filtrate is added 100 g. of active charcoal, and the mixture is shaken and filtered. The same process is repeated twice more using 50 g. and 30 g. of active charcoal, respectively. The active charcoal is extracted with four ca. 400 cc. portions of 50% pyridine under heating on the water-bath for 30 minutes and filtered while hot. The filtrate is concentrated to remove the pyridine completely, and the concentrated solution is shaken four times with the same volume of benzylalcohol, respectively. The aqueous layer is washed with the same volume of ether, concentrated under vacuum to ca. 50 cc. and poured into ca. 500 cc. of 99% alcohol, and after cooling with ice-water the precipitated FAD is filtered.

Example 4

To 1 kg. of wet mycelia obtained as in Example 2 is added a mixture of water and pyridine (20:80), and the mixture is heated on the water-bath and filtered with suction. This process is repeated to complete the extraction. The combined filtrates, after filtering again if necessary, are concentrated under vacuum to ca. 300 cc. and then shaken with chloroform to remove a part of V. $B_2$. After washing with ether the aqueous layer is shaken repeatedly with a ca. 500 cc. portion of benzylalcohol to remove V. $B_2$ completely. The aqueous layer is washed with the same volume of ether, concentrated under vacuum to ca. 50 cc. and poured into ca. 500 cc. of 99% alcohol, and after cooling with ice-water the precipitated FAD is filtered.

Example 5

Ten grams of crude FAD containing 10% of FAD is dissolved in 10 cc. of water, and 1.5 g. of hydrosulfite is added to the solution, when a yellowish green precipitate separates out. After washing twice with water the precipitate is suspended in 10 cc. of water, and air is passed through the suspension for 30 minutes, whereupon the suspension goes into a yellow solution. The solution is concentrated under vacuum to 2 cc. and 100 cc. of absolute alcohol is added, when FAD precipitates as yellow crystalline powder. The yield is ca. 650 mg. (purity, 80%).

Example 6

Five hundred milligrams of crude FAD containing 10% of FAD is dissolved in 30 cc. of 10% acetic acid, and the solution is subjected to electrolytic reduction (voltage, 10 v.; cathode, platinum or silver gilt with palladium). After one hour of reduction the separated yellow precipitate is filtered and suspended in a small amount of water, and air is passed through the suspension, when the suspension goes into a yellow solution. The solution is concentrated to ca. 5 cc. and poured into 100 cc. of absolute alcohol, and the separated yellow crystalline powder of FAD is filtered.

Example 7

One gram of crude FAD containing ca. 50% of FAD is dissolved in 5 cc. of water, and 1 cc. of a saturated solution of $Cr_2(SO_4)_3$ is added. The resulting yellow precipitate is oxidized with air in the same manner as in Example 6 to obtain 430 mg. of crystalline powder of FAD (purity, 70%).

We claim:

1. A process for the production of flavinadenine dinucleotide, which comprises cultivating *Eremothecium ashbyii* in an aqueous medium, separating the resulting mycelia as soon as propagation of the fungus has stopped, extracting said mycelia with an aqueous solvent, reducing the resulting aqueous extract with a chemical reducing agent, separating the resultant precipitated crystalline substance containing reduced-form flavinadenine dinucleotide, and oxidizing the precipitated reduced-form flavinadenine dinucleotide in a solvent therefor to obtain a solution of flavinadenine dinucleotide.

2. A process for the production of flavinadenine dinucleotide, which comprises cultivating *Eremothecium ashbyii* in an aqueous nutrient medium, separating the resulting mycelia as soon as propagation of the fungus has stopped, extracting the said mycelia with an aqueous solvent, reducing the so-obtained extract with a reducing agent which furnishes $S_2O_4^{--}$ ions, separating the resultant precipitated crystalline substance containing reduced-form flavinadenine dinucleotide, oxidizing the crystalline substance with air in a solvent for the former, and isolating flavinadenine dinucleotide from the resultant solution.

3. A process for the production of reduced-form flavinadenine dinucleotide, which comprises cultivating *Eremothecium ashbyii* in an aqueous nutrient medium, separating the resulting mycelia as soon as propagation of the fungus has stopped, extracting said mycelia with an aqueous solvent, reducing the so-obtained aqueous extract with a chemical reducing agent and separating the resultant precipitated crystalline substance containing reduced-form flavinadenine dinucleotide.

4. A process for the production of reduced-form flavinadenine dinucleotide, which comprises cultivating *Eremothecium ashbyii* in an aqueous nutrient medium, separating the resulting mycelia as soon as propagation of the fungus has stopped, extracting said mycelia with an aqueous solvent, reducing the so-obtained extract with a reducing agent which furnishes $S_2O_4^{--}$ ions, and separating the resultant precipitated crystalline substance containing reduced-form flavinadenine dinucleotide.

References Cited in the file of this patent

UNITED STATES PATENTS

| | | |
|---|---|---|
| 2,400,710 | Piersma | May 21, 1946 |
| 2,822,361 | Morehouse | Feb. 4, 1958 |

FOREIGN PATENTS

| | | |
|---|---|---|
| 593,953 | Great Britain | Oct. 30, 1947 |

OTHER REFERENCES

Nature, vol. 141, pp. 603 and 604 (1938).
Chemical Abstracts, vol. 48, page 3449 (1954).
Chemistry and Methods of Enzymes, by Sumner et al., 1953, publ. by Academic Press Inc. (New York), pp. 277 to 279.
The Vitamins, by W. H. Sebrell et al.; vol. 3 (1954), pp. 336 to 338, publ. by Academic Press Inc. (New York).

UNITED STATES PATENT OFFICE
CERTIFICATION OF CORRECTION

Patent No. 2,973,305  February 28, 1961

Toru Masuda et al.

It is hereby certified that error appears in the above numbered patent requiring correction and that the said Letters Patent should read as corrected below.

In the grant, line 2, for "Anagasaki" read -- Amagasaki --; column 1, line 63, for "liyquid" read -- liquid --; column 3, line 5, for "ployedf" read -- ployed --; column 4, line 26, for "coveed ith" read -- covered with --.

Signed and sealed this 25th day of July 1961.

(SEAL)
Attest:

ERNEST W. SWIDER
Attesting Officer

DAVID L. LADD
Commissioner of Patents